May 2, 1967 — H. C. PFAFF, JR — 3,317,170
PENDANT SUPPORT STRUCTURE
Filed June 28, 1965 — 2 Sheets-Sheet 1
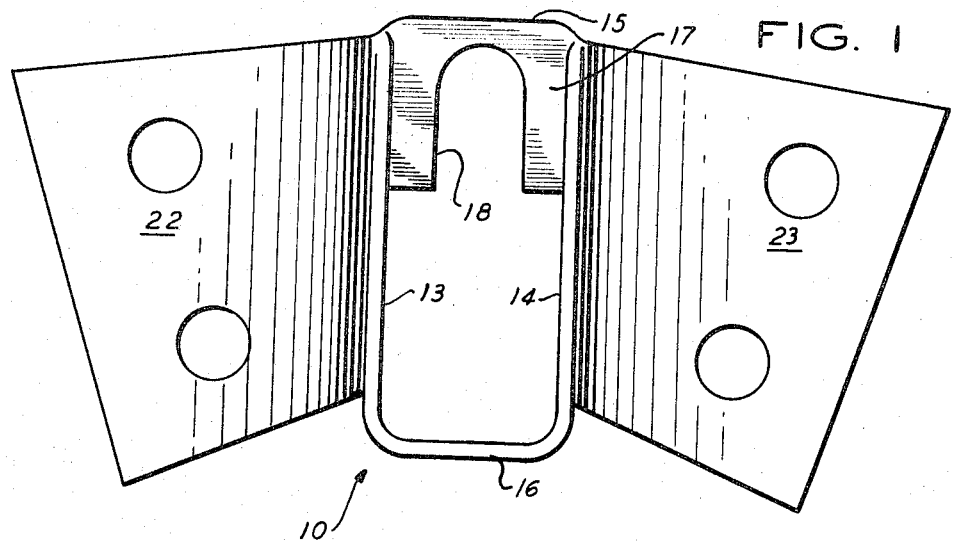
FIG. 1
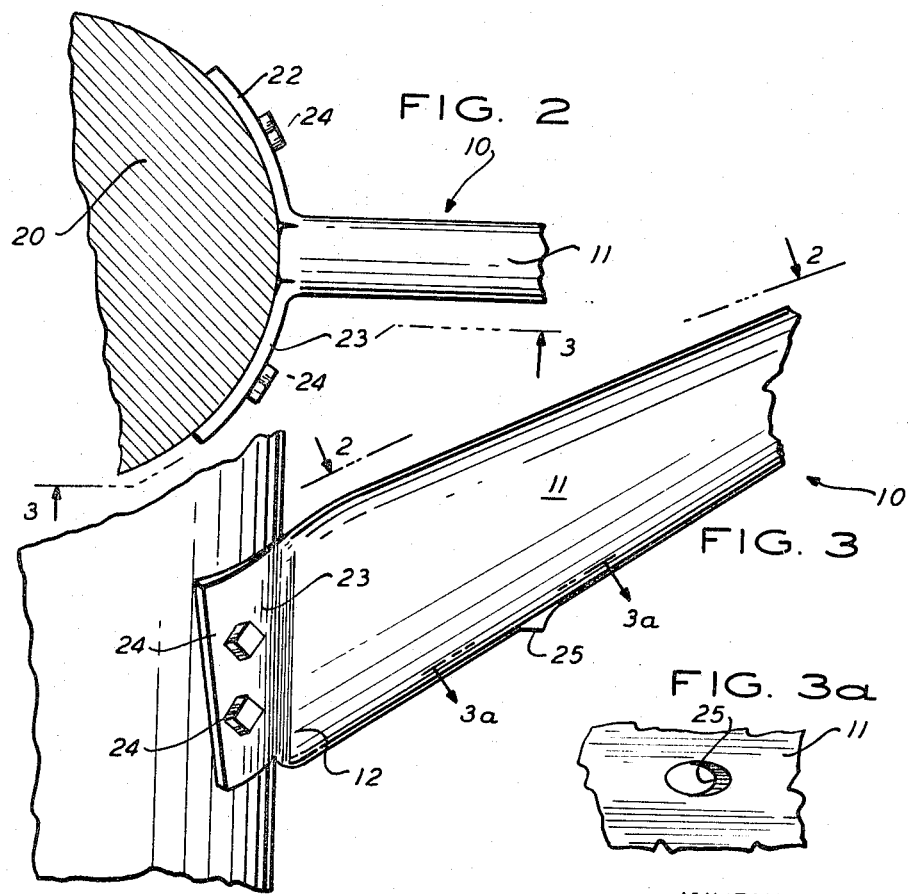
FIG. 2
FIG. 3
FIG. 3a
INVENTOR
H. C. PFAFF, JR
BY
ATTORNEY May 2, 1967  H. C. PFAFF, JR  3,317,170
PENDANT SUPPORT STRUCTURE Filed June 28, 1965  2 Sheets-Sheet 2

INVENTOR
H. C. PFAFF, JR
BY
ATTORNEY

United States Patent Office 3,317,170
Patented May 2, 1967

3,317,170
PENDANT SUPPORT STRUCTURE
Henry C. Pfaff, Jr., Summit, N.J., assignor to Pfaff and Kendall, Newark, N.J., a corporation of New Jersey
Filed June 28, 1965, Ser. No. 467,605
2 Claims. (Cl. 248—221)

This invention relates to a pendant structure adapted to be secured to a suitable supporting surface for the support of street lighting, traffic control, and other electrical units at points spaced from the supporting surface.

The device is especially adapted for attachment to wooden or other poles but may be used in connection with any other shaft or supporting surface.

The invention incorporates novel, unitary structural attaching means, which also serve for reenforcement; the practice heretofore was to fabricate the attaching means separately from the pole plate and then to fabricate the pole plate separately and secure the parts together by welding or otherwise join them to the arm proper. The advantage of the present invention, in addition to being far less costly to make, is that the bracket of the invenion is much stronger in fatigue characteristics and requires less space on the pole. High resistance to fatigue is obtained as there is no welding or other weakening operation which would reduce the strength or introduce protuberances or roughness that might shorten the life of the device.

Pole space is very valuable and is carefully allotted as to use. For example, telephone cables are alotted a certain elevation or height, power lines still another, traffic devices still another, etc. Pursuant to the instant invention only a few inches are required to mount a street light instead of the usual several multiples thereof, required in conventional practice; substantial saving in space is thus achieved, pursuant to the present invention; the freed space is thus available for other uses.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is an end elevational view of a device embodying the invention,

FIG. 2 is a top plan view, taken at line 2—2 of FIG. 3,

FIG. 3 is a similar, side elevational view, taken at line 3—3 of FIG. 2,

FIG. 3a is a fragmentary, sectional view, taken at line 3a—3a of FIG. 3,

Figure 4:
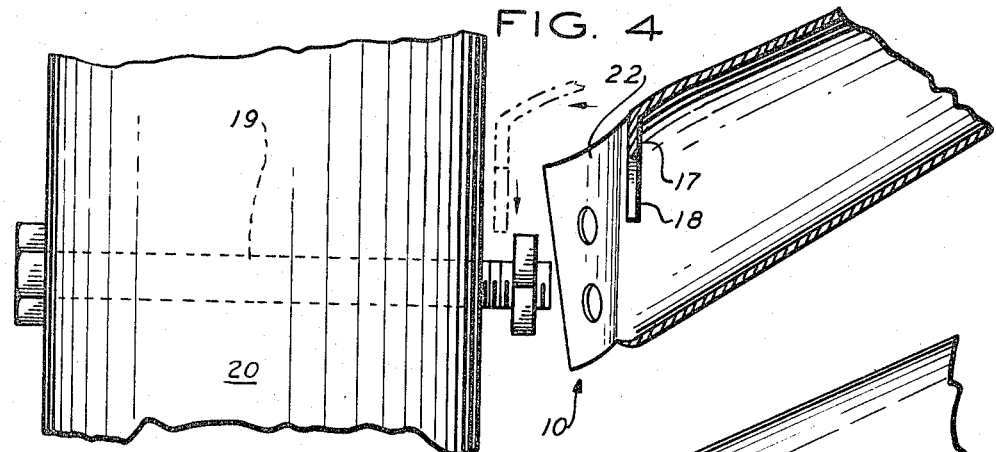
FIG. 4 is a partly sectional, elevational view, showing the pendant structure about to be positioned on a securing member extending from the supporting surface.

As shown in the drawings, the device of this invention comprises a pendant structure 10 for positioning on and extension from a supporting surface 20, which may be a shaft, such as a wooden pole or other surface, flat or otherwise. The pendant structure 10 is especially useful for attachment of traffic and other arms.

Figure 5:
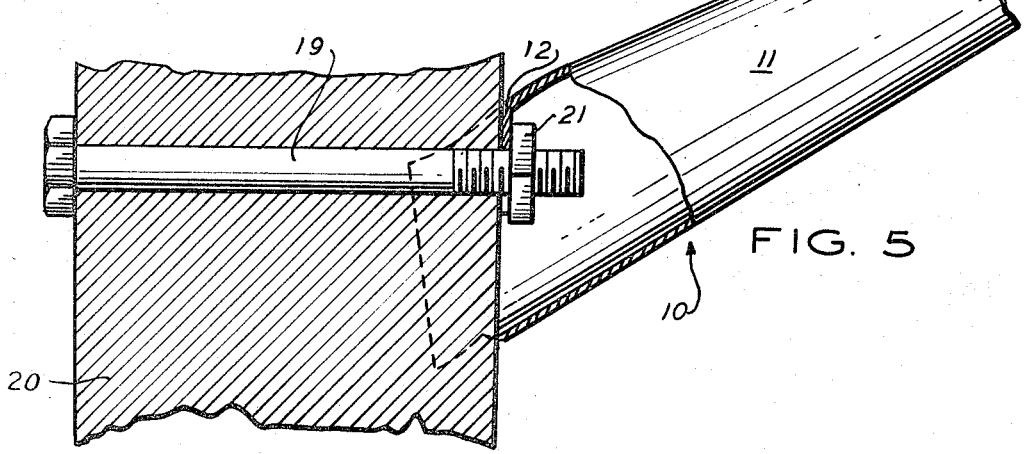
FIG. 5 is a similar view, showing the structure secured to the supporting surface.

Pursuant to the invention, but without limitation thereto, the entire pendant structure, including the elongated arm 11 and the other parts thereof, presently below described, may be cut and fabricated from a single blank of tubing, which may be extruded, rolled or otherwise formed to the contour desired—for example, tapered outwardly from one end 12 thereof (FIG. 3). The arm 11 is preferrably tapered outwardly away from the said one end 12 thereof. Said one end 12 of the arm may be formed (FIG. 4) at an acute or other angle to the longitudinal axis of the arm 11, and with parallel spaced side walls 13, 14 and upper and lower surfaces 15, 16. Said one end 12 of arm 11 may have formed unitarily with surface 15 thereof an end member 17 provided with slot 18, the end member being proportioned so that, after being so formed, it may be folded downwardly and into interfitting and reenforcing relation with the spaced parallel side walls 13, 14 (FIG. 1). This construction enables the pendant structure to be readily positioned on and secured to a through bolt 19 (FIG. 4), or other means secured to the supporting surface 20, with a latching element 21 (FIG. 5) such as a nut registered between and held from turning by the side walls 13, 14, so that the member 19 may be rotated to draw the parts together to complete the assembly. The arm 11 is further preferably provided with unitarily formed extensions or wings 22, 23 in diverging relation from said one end 12 for the reception of lag bolts 24. Said wing portions 22, 23 are preferably formed unitarily coextensive with side walls 13, 14 of the arm 11.

Figure 6:
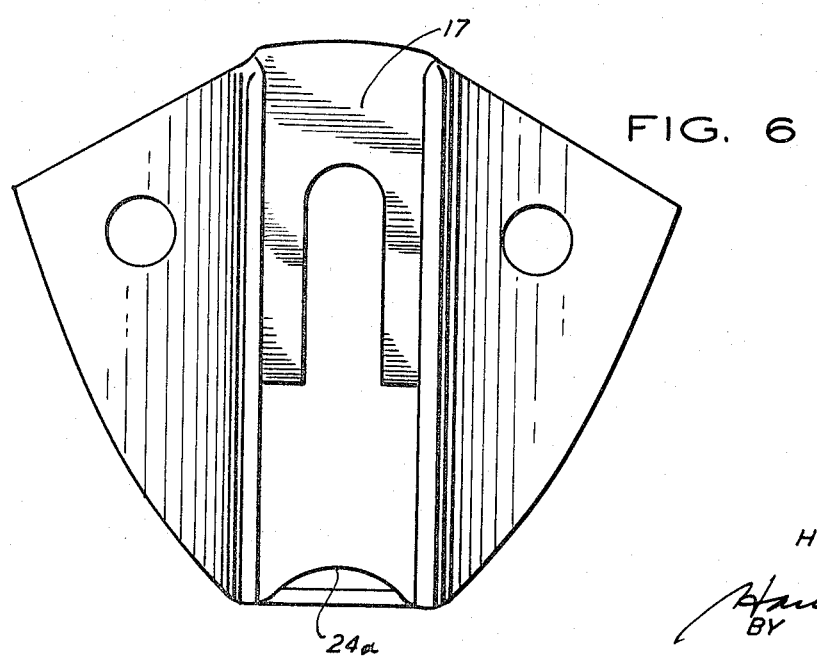
FIG. 6 is an end elevational view, similar to FIG. 1, of a further form of supporting member.

In the form shown in FIG. 6, the service wire entrance opening is formed at the lower surface 16 of the end 12 of the arm, as indicated at 24, and in the form shown in FIGS. 3 and 3a, the service wire entrance opening 24a is formed in the lower surface 16 of the arm in spaced relation to the said one end 12, by first forming said opening as a round opening 25 (FIG. 3a) and then inserting a bar in the opening and tilting the bar downwardly, distorting the lower surface of the opening and upwardly distributing its upper end to facilitate the entrance of the service wires.

While the foregoing disclosure of exemplary embodiments, is made in accordance with the patent statutes, it is to be understood that the invention is not limited thereto or thereby, the inventive scope being defined in the appended claims.

I claim:

1. A pendant structure comprising a tubular arm, wings extending from opposite sides of the arm, and a slotted plate secured to the arm extending between the wings and terminating within the tubular section, each of said wings being apertured and inclined about axes making an angle with the axis of the arm, and said plate lying in a plane containing said axes whereby to provide a continuous surface with the wings.

2. A device as defined in claim 1 wherein the wings are curved about an axis parallel to said axes.

References Cited by the Examiner
UNITED STATES PATENTS

| | | | |
|---|---|---|---|
| 1,714,814 | 5/1929 | Plimpton | 248—248 |
| 1,843,454 | 2/1932 | Manson | 248—221 |
| 2,608,369 | 8/1952 | Hoeher | 248—221 |
| 2,653,782 | 9/1953 | Pfaff | 248—221 |

CLAUDE A. LE ROY, *Primary Examiner.*

J. F. FOSS, *Assistant Examiner.*